United States Patent
Kim et al.

(10) Patent No.: US 8,729,727 B2
(45) Date of Patent: May 20, 2014

(54) CONTROLLER DRIVING APPARATUS OF ELECTRIC VEHICLE

(75) Inventors: Beomgyu Kim, Hwaseong (KR); Miok Kim, Gyeonggi-do (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 147 days.

(21) Appl. No.: 13/227,826

(22) Filed: Sep. 8, 2011

(65) Prior Publication Data
US 2012/0139337 A1    Jun. 7, 2012

(30) Foreign Application Priority Data
Dec. 1, 2010 (KR) .......................... 10-2010-0121477

(51) Int. Cl.
B60L 1/00 (2006.01)
B60L 3/00 (2006.01)
H02G 3/00 (2006.01)

(52) U.S. Cl.
USPC .......................................... 307/9.1; 307/10.1

(58) Field of Classification Search
USPC ................................. 307/9.1, 10.1
See application file for complete search history.

(56) References Cited

U.S. PATENT DOCUMENTS

| | | | | |
|---|---|---|---|---|
| 7,928,598 B2* | 4/2011 | King et al. | | 307/9.1 |
| 2005/0029867 A1* | 2/2005 | Wood | | 307/10.1 |
| 2010/0237694 A1* | 9/2010 | Fuma et al. | | 307/9.1 |
| 2010/0253145 A1 | 10/2010 | King et al. | | |
| 2011/0025124 A1* | 2/2011 | Brabec | | 307/9.1 |
| 2011/0187184 A1* | 8/2011 | Ichikawa | | 307/10.1 |

FOREIGN PATENT DOCUMENTS

| | | |
|---|---|---|
| JP | 2009-077557 A | 4/2009 |
| JP | 2009194986 A | 8/2009 |
| JP | 2010110196 A | 5/2010 |
| KP | 10-0507496 B1 | 8/2005 |
| KR | 10-2008-0056949 | 6/2008 |
| KR | 10-2008-0070679 A | 7/2008 |

* cited by examiner

Primary Examiner — Stephen W Jackson
Assistant Examiner — Rasem Mourad
(74) Attorney, Agent, or Firm — Edwards Wildman Palmer LLP; Peter F. Corless

(57) ABSTRACT

Disclosed is a controller driving apparatus of an electric vehicle which includes a first switch connected to a low-voltage DC-DC converter, a first port of a battery management system (BMS), and an electric vehicle controller, and a second switch connected to an output terminal of a high-voltage DC-DC converter connected to a second port of the BMS and an auxiliary battery connected to one end of the ignition switch, and a side connected to the low-voltage DC-DC converter, the one signal port of the BMS, and the electric vehicle controller. Finally, a third switch having connected between the auxiliary battery and a vehicle-on port of the BMS, and connected to the low-voltage DC-DC converter, the one signal port of the BMS, and the electric vehicle controller.

15 Claims, 4 Drawing Sheets

CONTROLLER DRIVING APPARATUS OF ELECTRIC VEHICLE

CROSS-REFERENCE TO RELATED APPLICATIONS

The present application claims priority to Korean Patent Application Number 10-2010-0121477 filed Dec. 1, 2010, the entire contents of which application is incorporated herein for all purposes by this reference.

BACKGROUND OF THE INVENTION

1. Field of the Invention

The present invention relates to a controller driving apparatus of an electric vehicle, and more particularly, to an apparatus for driving a controller of an electric vehicle, when the electric vehicle is started or charged at low or high speed

2. Description of Related Art

With the economical development, a demand for vehicles has rapidly increased. As the demand for vehicles has increased, waste gas discharged from vehicles is becoming a main factor of environmental pollution. Therefore, the reduction of waste gas emission of vehicles has been requested, and much research has been conducted on the development of vehicles capable of reducing waste gas emissions.

Furthermore, the increase of international oil price and the exhaustion of natural resources are accelerating the development competition of alternative energy sources.

According to such a trend, car makers of every country are keenly competing to develop a next-generation vehicle. There is an electric vehicle at the final destination of the competition.

An electric vehicle refers to a vehicle which operates by using electricity as a power supply source. An electric vehicle typically has a battery mounted therein, which may be charged as a power supply source, and is operated by using power supplied from the mounted battery. Also included therein is an electric motor which operates along with the battery as essential components. The electric motor is driven by electricity to operate the electric vehicle, and the battery supplies electricity to the electric motor.

As a method for charging such an electric vehicle, a method of charging the electric vehicle with household electricity is typically utilized. In effect, however, to increase the mileage of these electric vehicles, the capacity of batteries used in these electric vehicles should be enlarged. However, this also means that the charging time inevitably must also be increased as well.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY OF THE INVENTION

The present invention provides a controller driving apparatus of an electric vehicle, which is capable of driving only a necessary controller, according to a current state of the electric vehicle which may perform plug-in charging and quick charging therewith.

In the present invention, a wake-up signal of a vehicle controller is subdivided to drive only a necessary controller according to a current state of the electric vehicle. That is, during key-on, a wake-up signal is transferred to all of the controllers in the vehicle, and during plug-in charging, a wake-up signal is transferred to only controllers capable of performing charging and safety control in a high-voltage DC-DC converter. During quick charging, a wake-up signal is transferred to only controllers capable of performing charging and safety control in a battery management system (BMS).

In an exemplary embodiment of the present invention, a controller driving apparatus of an electric vehicle, which has a first switch having an input side connected to both ends of an ignition switch connected to other controllers, and an output side connected to a low-voltage DC-DC converter, a first signal port of a BMS, and an electric vehicle controller; a second switch having an input side connected to an output terminal of a high-voltage DC-DC converter connected to a second signal port of the BMS and an auxiliary battery connected to one end of the ignition switch, and an output side connected to the low-voltage DC-DC converter, the first signal port of the BMS, and the electric vehicle controller; and a third switch having an input side connected between the auxiliary battery and a vehicle-on port of the BMS, and an output side connected to the low-voltage DC-DC converter, first signal port of the BMS, and the electric vehicle controller.

As the ignition switch is turned on, the first switch may be turned on to transfer a vehicle driving signal to the BMS and the electric vehicle controller. The second switch may be turned on by a wake-up signal from the high-voltage DC-DC converter to transfer a vehicle driving signal to the electric vehicle controller, during plug-in charging by a household charger. Furthermore, the second switch may be turned on after the BMS is woken up, during the plug-in charging. The third switch may be turned on by the BMS to transfer a vehicle driving signal to the electric vehicle controller, during quick charging by a quick charger. Additionally, the third switch may be turned on after the BMS is woken up by a wake-up signal from the quick charger, during the quick charging.

In the illustrative embodiment of the present invention, the first, second and/or third switches may include a relay.

According to the exemplary embodiments of the present invention, a necessary controller is preferentially woken up, and the other controllers are woken up. Therefore, during charging, only the necessary controllers are operated, thereby reducing power consumption. Further, according to the exemplary embodiments of the present invention, since the BMS recognizes a current state, the management may be performed more stably.

The methods and apparatuses of the present invention have other features and advantages which will be apparent from or are set forth in more detail in the accompanying drawings, which are incorporated herein, and the following Detailed Description of the Invention, which together serve to explain certain principles of the present invention.

Figure 1:
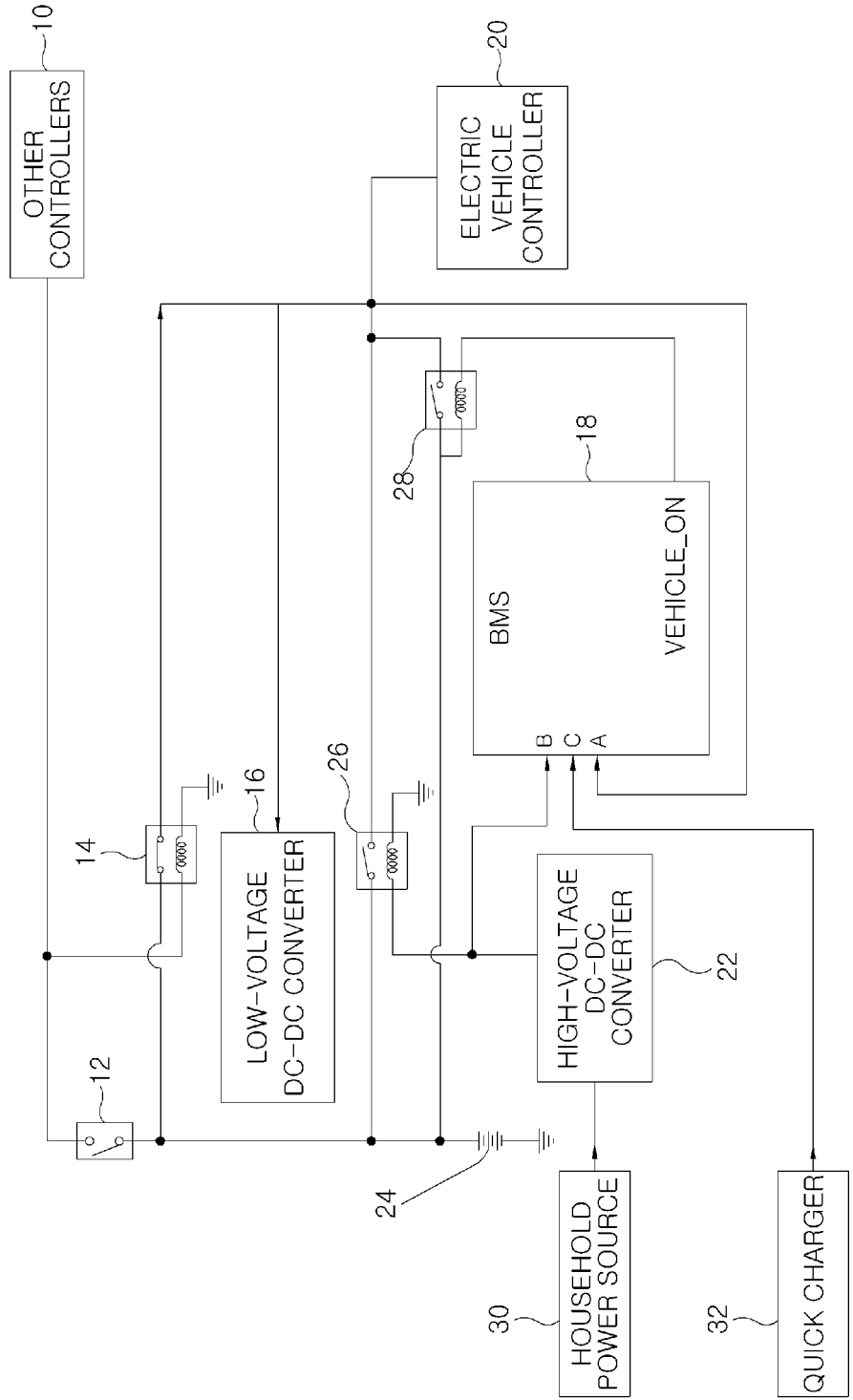
FIG. 1 is a configuration diagram of a controller driving apparatus of an electric vehicle according to an exemplary embodiment of the present invention.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION OF THE INVENTION

Reference will now be made in detail to various embodiments of the present invention(s), examples of which are illustrated in the accompanying drawings and described below. While the invention(s) will be described in conjunction with exemplary embodiments, it will be understood that present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Note that it is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

FIG. 1 is a configuration diagram of a controller driving apparatus of an electric vehicle according to an exemplary embodiment of the present invention. The controller driving apparatus of the electric vehicle according to the exemplary embodiment of the present invention includes a first switch 14, a second switch 26, and a third switch 28. The first switch 14 has an input side connected to both ends of an ignition switch 12 connected to other controllers 10. Furthermore, the first switch 14 has an output side connected to a low-voltage DC-DC converter 16, a first signal port A of a battery management system (BMS) 18, and an electric vehicle controller 20. The first switch 14 may include a relay. As the ignition switch 12 is turned on, the first switch 14 is turned on to transfer a vehicle driving signal to the BMS 18 and the electric vehicle controller 20.

The second switch 26 has an input side connected to an output terminal of a high-voltage DC-DC converter 22 connected to a third signal port B of the BMS 18 and an auxiliary battery 24 connected to one end of the ignition switch 12. Furthermore, the second switch 26 has an output side connected to the low-voltage DC-DC converter 16, and the first signal port A of the BMS 18, and the electric vehicle controller 20. The second switch 26 may also include a relay.

When the second switch 26 is turned on by a wake-up signal from the high-voltage DC-DC converter 22, a vehicle driving signal is transferred to the electric vehicle controller 20, during plug-in charging by a household charger. During the plug-in charging, the second switch 26 is turned on after the BMS 18 is woken up.

The third switch 28 has an input side connected between the auxiliary battery 24 and a vehicle-on port of the BMS 18. Furthermore, the third switch 28 has an output side connected to the low-voltage DC-DC converter 16, the signal port A of the BMS 18, and the electric vehicle controller 20. Meanwhile, second signal port C of the BMS 18 may be connected to a quick charger 32. The third switch 28 may also include a relay. The third switch 28 is turned on by the BMS 18 and transfers a vehicle driving signal to the electric vehicle controller 20, during quick charging by quick charger 32. During the quick charging, the third switch 28 is turned on after the BMS 18 is woken up by a wake-up signal from quick charger 32.

Figure 2:
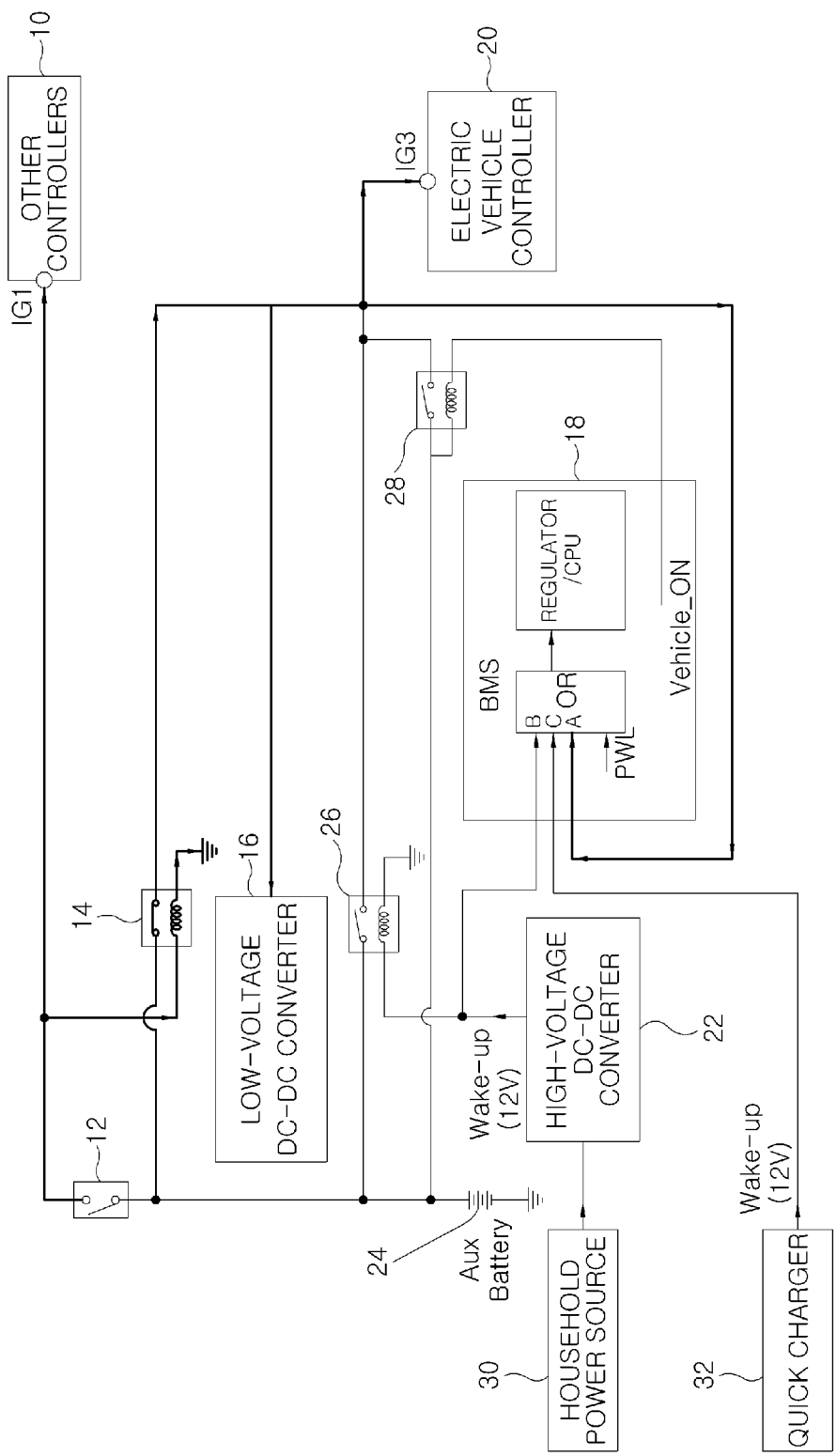
FIG. 2 is a diagram explaining the controller driving sequence of the electric vehicle during key-on, according to the exemplary embodiment of the present invention.

FIG. 2 is a diagram explaining the controller driving sequence of the electric vehicle during key-on according to the exemplary embodiment of the present invention. When a driver of the electric vehicle turns on the ignition switch 12, other controllers 10 of the vehicle are woken up by a vehicle driving signal IG1. Then, as the ignition switch 12 is turned on, the first switch 14 is turned on. Accordingly, a vehicle driving signal IG3 is transferred to the low-voltage DC-DC converter 16, the BMS 18, and the electric vehicle controller 20 to thereby drive the vehicle. Accordingly, the BMS 18 recognizes that the vehicle is in a key-on state, through a signal inputted to signal port A.

Figure 3:
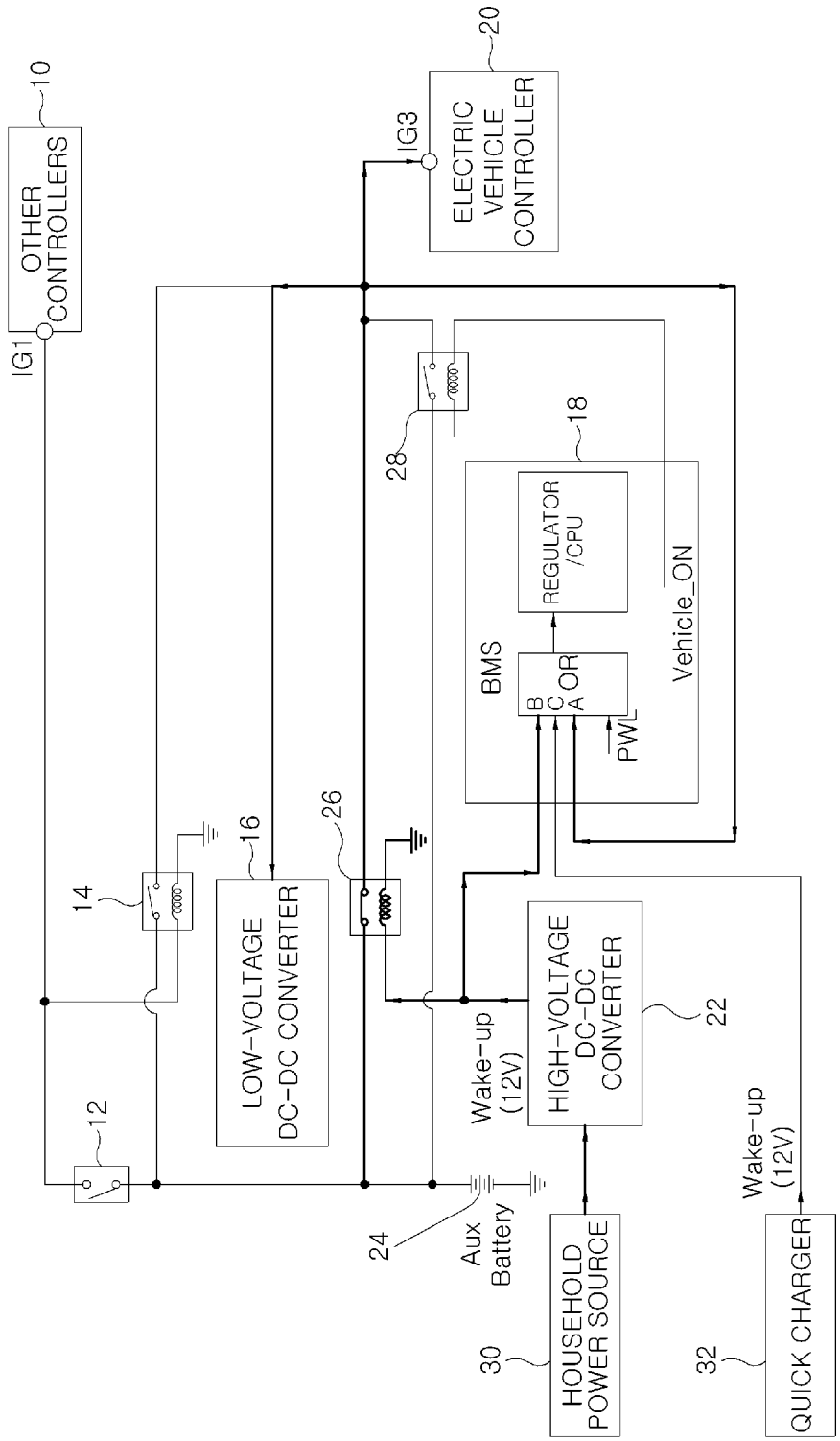
FIG. 3 is a diagram explaining the controller driving sequence of the electric vehicle during charging by a household power source, according to the exemplary embodiment of the present invention.

FIG. 3 is a diagram explaining the controller driving sequence of the electric vehicle during charging by a household power source, according to the exemplary embodiment of the present invention. More specifically, when the driver of the electric vehicle connects a household power source 30 to the electric vehicle to charge the electric vehicle, that is, during plug-in charging by a household charger, the household power source 30 is applied to the high-voltage DC-DC converter 22.

Accordingly, high-voltage DC-DC converter 22 outputs a wake-up signal. The wake-up signal outputted from the high-voltage DC-DC converter 22 is applied to the third signal port B of the BMS 18 to wake up the BMS 18.

Subsequently, the second switch 26 is turned on by the wake-up signal outputted from the high-voltage DC-DC converter 22. Accordingly, a vehicle driving signal IG3 is transferred to the low-voltage DC-DC converter 16, the BMS 18, and the electric vehicle controller 20 to thereby drive the vehicle.

The BMS 18 recognizes that the household charger is connected to the vehicle, through the inputted wake-up signal and vehicle driving signal IG3. Then, when the charger is connected in a key-off state, only the controller related to high-voltage battery charging is woken up and operated.

Figure 4:
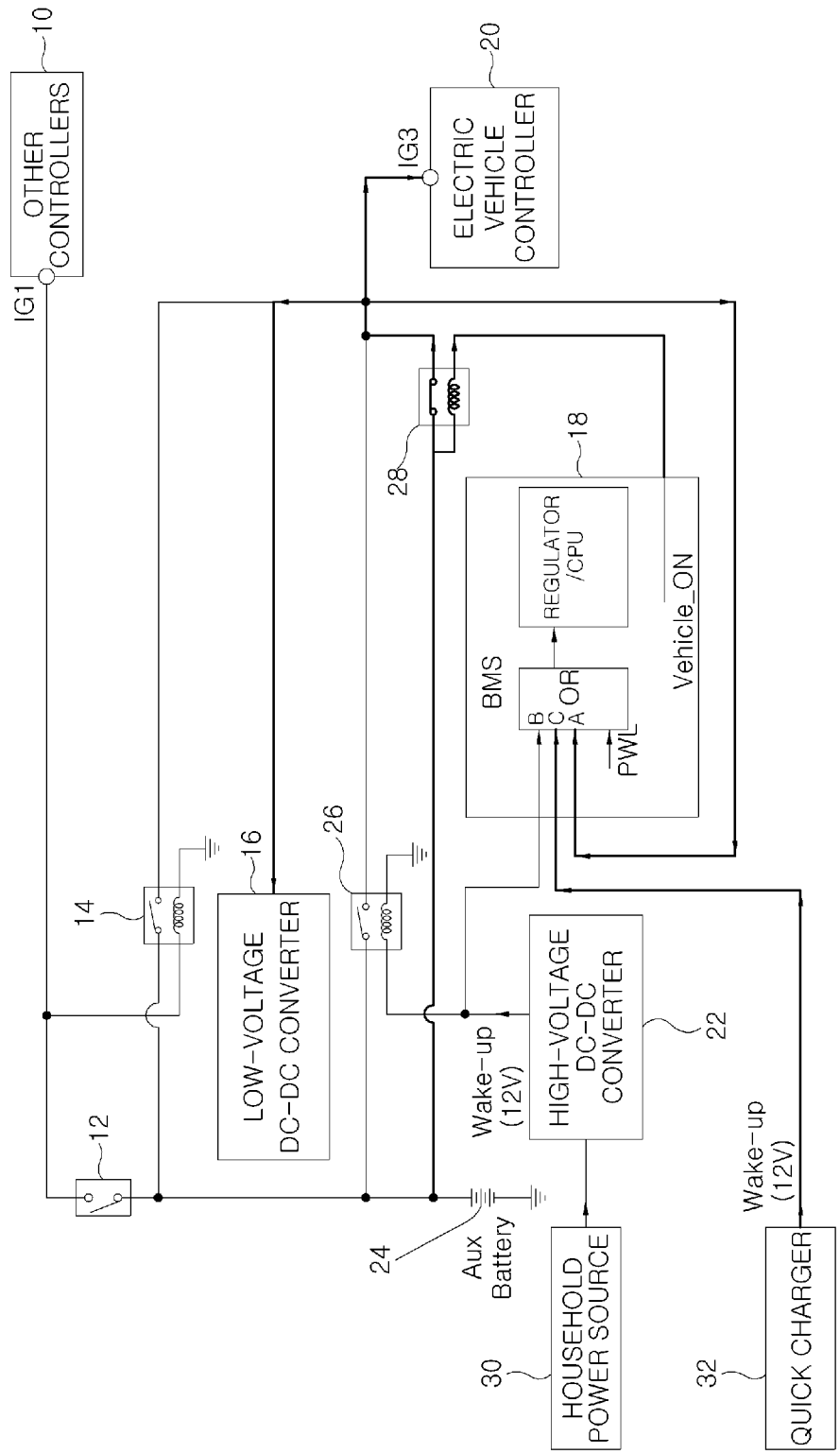
FIG. 4 is a diagram explaining the controller driving sequence of the electric vehicle during quick charging, according to the exemplary embodiment of the present invention.

FIG. 4 is a diagram explaining the controller driving sequence of the electric vehicle during quick charging, according to the exemplary embodiment of the present invention. More specifically, when the quick charger 32 is connected to the electric vehicle, a wake-up signal of the quick charger 32 is inputted to second signal port C of the BMS 18 and the BMS 18 is woken up.

The woken-up BMS 18 then recognizes that the quick charger 32 is currently connected, and controls the third switch 28 through the vehicle-on port. Subsequently, the third switch 28 is turned on by the control of the BMS 18. Accordingly, the vehicle driving signal IG3 is transferred to the low-voltage DC-DC converter 16, the BMS 18, and the electric vehicle controller 20 to thereby perform quick charging.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A controller driving apparatus of an electric vehicle, the apparatus comprising:
    a first switch having an input side connected electrically adjacent to an input and output end of an ignition switch that is connected to one or more other controllers, and an output side connected electrically adjacent to each of a low-voltage DC-DC converter, a first signal port of a battery management system (BMS), and an electric vehicle controller;
    a second switch having an input side connected to an output terminal of a high-voltage DC-DC converter connected to a second signal port of the BMS and an auxiliary battery connected to one end of the ignition switch, and an output side connected electrically adjacent to each of the low-voltage DC-DC converter, the first signal port of the BMS, and the electric vehicle controller; and
    a third switch having an input side connected between the auxiliary battery and a third port of the BMS, and an output side connected electrically adjacent to each of the low-voltage DC-DC converter, the first signal port of the BMS, and the electric vehicle controller.

2. The apparatus as defined in claim 1, wherein, as the ignition switch is turned on, the first switch is turned on to transfer a vehicle driving signal to the BMS and the electric vehicle controller.

3. The apparatus as defined in claim 1, wherein the second switch is turned on by a wake-up signal from the high-voltage DC-DC converter and transfers a vehicle driving signal to the electric vehicle controller, during plug-in charging by a household charger.

4. The apparatus as defined in claim 3, wherein the second switch is turned on after the BMS is woken up, during the plug-in charging.

5. The apparatus as defined in claim 1, wherein the third switch is turned on by the BMS and transfers a vehicle driving signal to the electric vehicle controller, during quick charging by a quick charger.

6. The apparatus as defined in claim 5, wherein the third switch is turned on after the BMS is woken up by a wake-up signal from the quick charger, during the quick charging.

7. The apparatus as defined in claim 1, wherein the first switch comprises a relay.

8. The apparatus as defined in claim 1, wherein the second switch comprises a relay.

9. The apparatus as defined in claim 1, wherein the third switch comprises a relay.

10. A circuit of an electric vehicle, the circuit comprising:
    a first switch having an input side connected to both ends of an ignition switch connected to one or more controllers, and an output side connected electrically adjacent to each of a low-voltage DC-DC converter, a first port of a battery management system (BMS), and an electric vehicle controller;
    a second switch having an input side connected to an output terminal of a high-voltage DC-DC converter connected to second port of the BMS and a battery connected to one end of the ignition switch, and an output side connected electrically adjacent to each of the low-voltage DC-DC converter, the first port of the BMS, and the electric vehicle controller; and
    a third switch having an input side connected between the battery and a third port of the BMS, and an output side connected electrically adjacent to each of the low-voltage DC-DC converter, the first port of the BMS, and the electric vehicle controller.

11. The circuit as defined in claim 10, wherein, as the ignition switch is turned on, the first switch is turned on to transfer a first signal to the BMS and the electric vehicle controller.

12. The circuit as defined in claim 10, wherein the second switch is turned on by a wake-up signal from the high-voltage DC-DC converter and transfers a vehicle driving signal to the electric vehicle controller, during charging by a charger.

13. The circuit as defined in claim 12, wherein the second switch is turned on after the BMS is woken up, during charging.

14. The circuit as defined in claim 10, wherein the third switch is turned on by the BMS and transfers a vehicle driving signal to the electric vehicle controller, during quick charging by a quick charger.

15. The circuit as defined in claim 14, wherein the third switch is turned on after the BMS is woken up by a wake-up signal from the quick charger, during the quick charging.

* * * * *